United States Patent Office 3,400,095
Patented Sept. 3, 1968

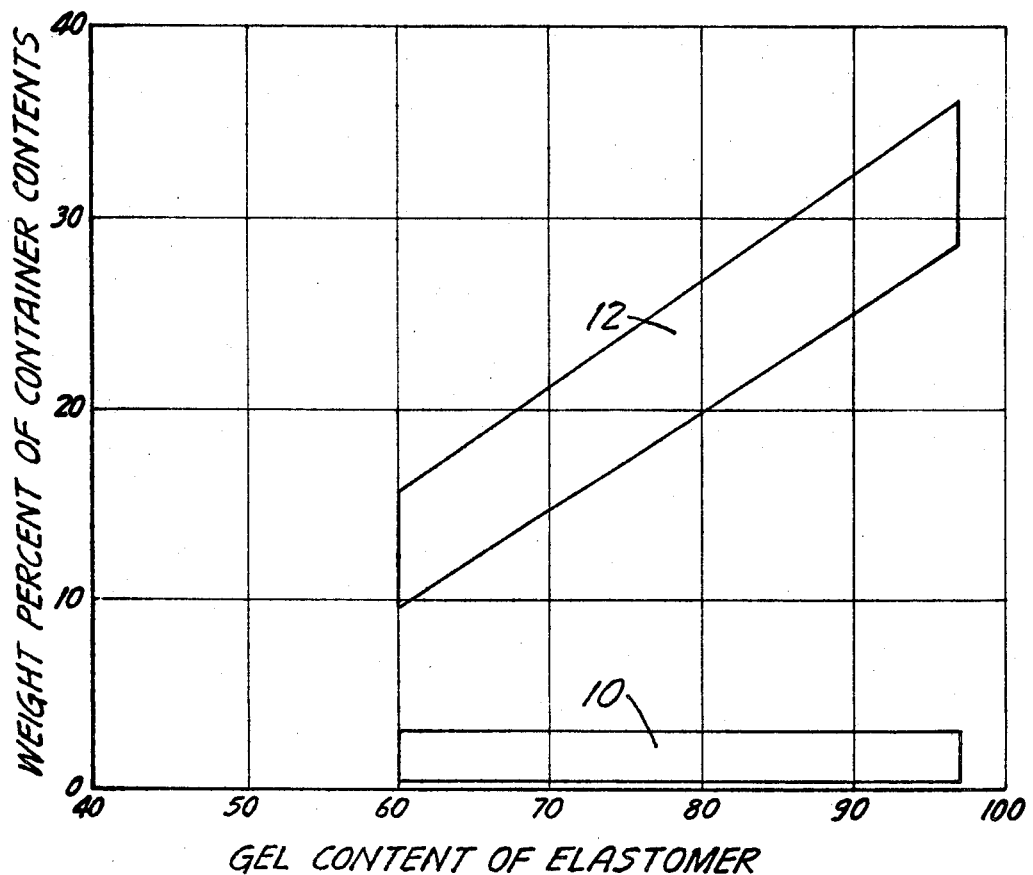

3,400,095
HIGH SOLIDS CONTENT ELASTOMER-BASED AEROSOL SPRAY ADHESIVE
Leon V. Kremer, Cottage Grove Township, Washington County, and George M. Rambosek, Maplewood Village, Minn., assignors to Minnesota Mining and Manufacturing Company, St. Paul, Minn., a corporation of Delaware
Continuation-in-part of application Ser. No. 453,825, May 6, 1965. This application Mar. 17, 1967, Ser. No. 623,986
4 Claims. (Cl. 260—32.8)

ABSTRACT OF THE DISCLOSURE

Aerosol packaged spray adhesives including a 10–35% by weight dispersion of crosslinked dispersed insoluble high strength milled rubbery polymer in organic liquid together with tackifier resin and a small amount of soluble elastomer which sprays without forming rubbery strings or nonadherent mist.

---

This application is a continuation-in-part of our co-pending application Ser. No. 453,825, filed May 6, 1965, now abandoned.

This invention relates generally to aerosol packaged adhesives. More particularly, the invention relates to aerosol packaged high solids content adhesives having a high elastomer content.

There has been a considerable demand for high strength aerosol packaged adhesives which can be sprayed on materials such as paper, cardboard, cloth, or foamed plastics. Prior to the present invention, such adhesives which provided good resistance to shear and peel contained less than about 5% by weight elastomeric material. The low solids contents at which such adhesives are conventionally packaged are not only wasteful of solvent and propellant, but result in a thin spray in which the volatiles soak into porous substrates. As a result, substrates such as paper are made translucent by the volatile liquids and other fragile objects tend to be otherwise injured by the solvents used. In order to provide aerosol adhesives having a reasonably high solids content it has often been attempted to add an inert solid filler. However, compositions containing such fillers do not provide the desired high strength adhesive bonds. When it was attempted to add elastomeric materials to the adhesives it was found that the materials would gum up and flow out of the container in rubbery strings rather than as a usable spray. It was also found that elastomeric materials agglomerated within the container into a semisolid mass or irreversibly separated into two or more phases, thus rendering the material unsprayable.

Highly cross-linked or "gelled" elastomers have been known in the adhesives art for some time: see for example Stevens U.S. Patent No. 2,673,845, granted Mar. 30, 1954. Previous to this, Finn Patent No. 2,537,982, granted Jan. 16, 1951, concerned self-toughening adhesive cements comprising elastomers such as copolymers of butadiene and acrylonitrile. Finn also observes that theretofore rubbery butadiene-acrylonitrile polymers had been vulcanized in adhesive compositions, and discusses the difficulties or problems in respect thereto. More recently, Hendricks et al., Canadian Patent No. 586,489, issued Nov. 3, 1959, based on a United States filing date of Apr. 18, 1955, discloses adhesive cement compositions containing highly cross-linked elastomers for general spray applications. However, none of these earlier efforts concerned themselves with the specific problems of providing elastomeric based adhesives, at high solids content, (e.g., above about 10 percent) in aerosol containers which can be stored for long periods and sprayed without stringing out or "cob-webbing" on the one hand, or unduly misting, on the other hand. Insofar as we are aware, no one, prior to the present invention has practically or commercially provided such a high strength elastomer-based aerosol packaged adhesive.

The present invention has overcome the difficulties of the prior art by providing an aerosol packaged elastomeric adhesive containing a high solids content, i.e., between about 10 and 35 percent by weight of the contents of the container. The solid component of the adhesives of the present invention contain a substantial amount of dispersed insoluble elastomeric material generally ranging from 5% to 25% of the weight of the contents of the container. The compositions of the present invention remain sprayable for an extended period of many months or years, requiring at most only slight shaking by hand of the container to redisperse the contents. It has been found that the desired results are achieved by providing the rubbery polymer in the form of small dispersed insoluble particles combined with a small, but significant, amount of soluble elastomer. The insoluble particles should range in size from at least large enough to be discrete insoluble (though swelled) particles of colloidal size in the carrier liquid up to larger particles which either remain suspended in the carrier liquid for a considerable period of time after mixing of the ingredients or can be redispersed and remain so for minutes or hours after agitation, e.g., by hand shaking. In commercial practice it is preferred to screen out particles larger than about 150 microns from the dispersion in order to remove material which would settle out in the container and/or plug the nozzle.

The preferred embodiments of the present invention incorporate a balanced proportion of such insoluble particles in combination with a tackifier resin and a small amount of elastomer which is soluble in the carrier liquid. The soluble elastomer must constitute between 0.3 and 3% by weight of the total contents of the container. It has been found that if less than 0.3% soluble rubber is present, the composition will spray out as an unusuable mist. On the other hand, if more than 3% soluble rubber is present, the composition will spray out as rubbery strings. It has been discovered that a small but important amount of soluble elastomer must be present in addition to the insoluble elastomer and tackifier resin. Without the soluble material the compositions form a nonadherent mist. As will be more fully explained hereinafter, if more highly gelled (i.e., insoluble) rubbers are used, the percentage of total elastomer in the container must be increased in order to provide the required amount of soluble elastomer in the adhesive.

In the drawings, FIGURE 1 is a graph showing the useful compositions in terms of percentage of ingredients in the container at different gel contents.

Referring more particularly to the drawings, the percentages based on the total container contents of insoluble elastomer and soluble elastomer are plotted for different gel contents. Gel content is defined as the percentage of insoluble elastomer in a particular elastomer sample when dissolution is attempted in a good organic solvent. As seen from the curves, the amount of soluble elastomer which can be present in the container, indicated by area 10 on the graph, remains substantially constant for elastomers of different gel content. In order to maintain the required amount of soluble elastomer, the amount of insoluble elastomer, presented by area 12 on the graph, must be progressively increased as the gel content of the elastomer increases.

The minimum gel content which has been found useful is about 60%, because at gel contents below about 60% the total elastomer content in the container becomes too low so that the high solids content product of this invention is no longer obtained. The maximum gel content which appears to be useful is about 97%. At gel contents above this amount, the elastomer content in the container must be increased in order to provide the required amount of soluble elastomer to such a high amount that the contents of the container will no longer readily spray through an orifice, but will rather flow out as a solid stream or "squirt" in the manner resulting from a common toy squirt gun. Thus elastomers having gel contents from about 60 to 97% are useful, and the amounts used in the container must be varied in accordance with the accompanying graphs in order to provide a relatively constant small amount of soluble elastomer. This amount of soluble material may be varied from about 0.3 to about 3% of the contents of the container in order to provide a usefully sprayable adhesive.

Various types of aerosol containers, such as are known to those skilled in the art, can be used in practicing the invention. Conventional tin-plated cans will generally suffice, but if the adhesive composition contains ingredients reactive with the metal of the containers, the same should be coated on their inner surfaces with a stable polymeric coating such as a vinyl or an epoxy polymer in order to minimize any deleterious interaction between the adhesive composition and the container. The aerosol container preferably is of the type in which the propellant is in liquefied form and mixed with the adhesive composition. As the stream of adhesive and liquefied propellant is dispensed from the orifice in the nozzle of the aerosol container, the propellant vaporizes substantially instantaneously, thereby breaking up the stream into airborne particles of the desired size. The pressures used generally range between 25 and 45 p.s.i.g., the latter limit being imposed for reasons of safety during shipment and storage. About 35 p.s.i.g. pressure in the container is generally preferred.

Conventional pressure-liquefiable, normally gaseous propellants such as propane, carbon dioxide and commercial "Freon" can be used in connection with the invention. In the container the propellant is present (being usually charged) in liquefied form. Since it generally is mixed with the adhesive composition, the propellant should be of a type which will not interact with the packaged adhesive in such a manner that the adhesive properties will be adversely affected. The liquefied propellant in such cases will become part of the solvent system in the container, and some ingredients of propellant systems such as methylene chloride, conventionally used as a vapor pressure depressant for liquefied propellants will also exhibit a solvating effect on the materials dissolved and suspended in the liquid in the container. This in some instances may be advantageous.

The principal ingredients of the adhesive compositions of the present invention are a rubbery elastomeric composition and a carrier liquid therefor in which the elastomer is substantially insoluble. It is often desirable to add substantial amounts of tackifier resins in order to improve the adhesive properties of the composition, and if desired, such ingredients as viscosity stabilizers and antioxidants in minor amounts. Tackifier resins are known to those skilled in the art; see, for example, U. S. Patent 3,239,478 (Harlan) issued Mar. 8, 1966.

The solvent or carrier liquid is generally selected on the basis of the end use requirements, solvent properties and compatability with the adhesive components. The liquid should be such that it will not dissolve, discolor or otherwise harm the substrates on which the adhesive is to be applied. Examples of suitable organic liquids include hexane, methyl ethyl ketone, methyl isobutyl ketone, and various alcohols. The solvent properties of the liquid should be such that the elastomeric composition used is dispersible therein while the resinous and stabilizing components, if any, are soluble therein.

A wide variety of elastomeric materials can be used in practicing the invention. The preferred compositions are highly cross-linked addition polymers, such as butadiene - styrene, butadiene - acrylonitrile and polychloroprene rubbers. Conventional cross-linking agents such as divinyl benzene or the equivalent are preferred. Further cross-linking agents for diene rubbers are listed in U. S. Patent No. 2,673,845, aforesaid. Other cross-linked rubbers having the required gel content, such as polyurethanes, polysulphide rubbers, etc., may also be used.

It is possible to place the elastomeric material in suspension in the organic carrier liquid by a number of methods. For example, a latex can be coagulated, dried, and broken down, e.g., by milling, and then taken up in the organic system. Or, the aqueous latex suspension can be converted to an organic suspension by employing extraction or distillation techniques as generally shown in Hendricks et al., Canadian Patent No. 586,489. Due regard in either of these methods should, of course, be given to the milling in accordance with the teachings herein so as to render it useful in the aerosol packaged elastomeric adhesives of the present invention. Generally latex polymerized rubbers are cross-linked to such a high degree that additional soluble rubber must be added separately.

It is preferred to use dry polymers which must be milled before dispersion in the carrier liquid. The dry polymers have the advantage that the absence of water in the system minimizes corrosion and other deleterious side reactions of the adhesive compositions. Moreover, the dry polymers are generally washed to eliminate impurities such as surfactant, stablizers, etc., present from the polymerization process. The absence of these impurities provides somewhat better adhesive qualities. Greater freedom in compounding is also possible since the choice of solvents, and consequently the resins soluble therein, is not limited as in the case of dispersions obtained by solvent extraction processes in which only a limited number of solvents are operative.

The invention will be further explained with reference to the following nonlimitative examples. All parts given are by weight unless otherwise noted.

Example I

A base polymer was prepared by milling in an 84 inch rubber mill the following elastomeric polymers starting from slab form:

Parts by weight
Cross-linked butadiene-styrene polymer formed by the reaction of approximately 72 parts butadiene, 27.3 parts styrene, and approximately 0.7 part divinyl benzene ("FRS–1009") _____ 80
Cross-linked butadiene-styrene polymer formed from approximately 72 parts butadiene, 27.6 parts styrene, and approximately 0.4 part divinyl benzene ("Synpol 1009") _____ 20

The mill was set to operate with a gap between the rolls of 0.110 inch and a friction ratio of 1.25 to 1.00 (i.e., one of the rolls was rotated at a speed 1.25 times the speed of the other roll). The milling was continued for about 2½ minutes during which time the temperature of the material was kept in the temperature range of 80° F. to 135° F.

The milling conditions just specified, while suitable for the particular batch of elastomer used, are somewhat approximate. In order to obtain optimum spray qualities and to contend with variations in properties occurring among different batches of commercially available materials, we prefer at this point to run the following test: In order to determine the exact milling conditions required to obtain optimum spray characteristics from a particular stock it has been found desirable to prepare an aliquot portion of the adhesive formulation given below leaving out the methylene chloride and a portion of the hexane to test the spray-ability thereof, for example, by spraying through a low air volume spray gun such as the De Vilbiss P–CGA–501FF. In carrying out this test, a laboratory sized quantity of the elastomer is prepared on a laboratory rubber mill, and any high shear type laboratory mixing equipment can be used to prepare the adhesive. Only sufficient hexane to reduce the viscosity to 2000 centipoises should be added. It has been found that formulations which spray satisfactorily on a vertical surface 24 inches distant from the nozzle at 2000–2300 centipoises using the low air volume equipment will spray satisfactorily from an aerosol container. If stringing or "cob-webbing" occurs, this is an indication that too much soluble elastomer is present. The amount of soluble rubber is preferably reduced by reducing the mill time to a minimum of 2 minutes while holding other variables constant. If reducing the mill time to 2 minutes does not eliminate the "cob-webbing," the milled product should be allowed to stand for 1 to 4 days at room temperature to permit the product to cross-link again into insoluble rubber. If, on the other hand, excessive misting occurs, this is an indication that the proportion of insoluble rubber is too high. In this event the mill time is increased to further reduce the particle size and break more of the rubber down into soluble elastomer until a sprayable mixture is produced.

The adhesive formulation into which the prepared elastomer is incorporated is as follows:

| | Parts by weight |
|---|---|
| Milled base elastomer | 100 |
| 80% dimeric pine wood resin acids; 20% monomeric pine wood resin acids and neutral material ("Dymerex" resin) | 100 |
| Glycerol ester of hydrogenated rosin ("Stabalite Ester #10") | 40 |
| Antioxidant (mixture of octylated diphenyl amines, "Agerite Stalite") | 2 |
| Morpholine (a viscosity stabilizer) | 1 |
| Hexane | 450–500 |
| Methylene chloride | 50 |

All of the materials except the methylene chloride and a portion of the hexane were mixed in a high shear Struthers-Wells mixer until a smooth uniform mixture was produced. The methylene chloride was added while mixing was continued and the viscosity of the resulting mixture was adjusted to 700 centipoises by adding further hexane. The resinous components dissolved in the hexane while most of the elastomeric components were present in the form of dispersed, insoluble "gelled" particles.

90 parts of this mixture were charged into a tin plated aerosol can. The can was purged of air. The valve assemblies (Newman Green B–14–10) were put into place and crimped onto the can. 15 parts propane propellant were forced through the valve to pressurize the can. Newman Green B–20–20 actuators were placed over the valves. These actuators were provided with orifices 0.018 inch in diameter. The mixture in the can contained approximately 26% solids and was under a gauge pressure of 35 p.s.i. at 70° F. The adhesive sprayed well from the aerosol container without "cob-webbing" or excessive misting. When sprayed on porous substrates such as styrofoam the adhesive coated the surface without seriously wetting the substrate with a uniform, tacky, rubbery coating. The adhesive did not wrinkle paper when sprayed thereon.

In contrast with previous attempts to package elastomeric adhesives of high elastomer content in an aerosol container the composition of the present example was remarkably stable even after standing for an extended length of time. The contents did not agglomerate and the material remained in a sprayable form, requiring only slight shaking by hand of the container to redisperse the contents.

EXAMPLE II

| | Parts by weight |
|---|---|
| A butadiene-acrylonitrile polymer crosslinked with divinyl benzene and polymerized to contain approximately 31% bound acrylonitrile (FRN–1310) | 100 |
| Zinc oxide | 10 |
| Oil soluble, heat hardening phenolaldehyde resin formed by alkaline catalyzed reaction of formaldehyde with less than a mol proportion of para-tertiary butyl phenol (Super Beckacite 1003) | 50 |
| Glycercol ester of pine wood rosin, said rosin containing highly oxidized and highly polymerized abietic acid and terpene, including phenolic constituents (Vinsol Ester Gum) | 50 |
| Salicylic acid | 15 |
| Methyl ethyl ketone | 500 |

The polymer was milled on a 16 inch laboratory rubber mill set to operate with a gap between the rolls of 0.05 inch and a friction ratio of 1.33 to 1. The milling was continued for 10 minutes during which time the temperature of the elastomer was limited to a maximum of about 120° F. by cold water cooling the mill. The milled elastomer was blended with the remainder of the ingredients in a high shear mixer until smooth and uniform. The viscosity was reduced to 2000 c.p.s. by dilution with methyl ethyl ketone.

90 parts of this mixture and 15 parts of dichlorodifluoro methane propellant (sold commercially as "Freon 12") were packaged in an epoxy-lined aerosol container using the procedure of Example 1. The mixture in the aerosol can contained approximately 20% solids and approximately 9% elastomer by weight and was pressurized at a gauge pressure of 35 p.s.i.g. at 70° F. The adhesive sprayed from the aerosol container with a uniform, smooth pattern of high adhesive strength without stringing, squirting, or excessive misting. As in Example I, the adhesive could be sprayed onto porous surfaces such as paper without wrinkling or excessive "wetting."

EXAMPLE III

| | Parts by weight |
|---|---|
| Dried, milled, cross-linked polychloroprene elastomer (sold in latex form as Neoprene 572) | 90 |
| Polychloroprene (sold as Neoprene AF) | 10 |
| Oil soluble, heat hardening, para-tertiary butyl-phenol formaldehyde resin made with an alkaline catalyst with between 1.5 and 2.0 mols of formaldehyde for each mol of substituted phenol (Union Carbide CKR 1634) | 50 |
| Light calcined magnesia | 12.5 |
| Water | 1.0 |
| Toluol | 95 |
| Petrobenzol, also known as textile spirits, a petroleum naphtha from a distillation range of 140°–200° F. | 118 |
| Acetone | 78 |

The above adhesive composition was prepared by coagulating the "Neoprene 572" latex with acetone and drying for 60 hours at 120° F. The dried polymer and the Neoprene AF were milled together on the laboratory rubber mill set to operate as in Example II for 20 minutes. The temperature of the elastomer in the mill reached a maximum of about 140° F. A premix was then made by reacting the CKR 1634, magnesia and water in the toluol in a Kady Mill (sold by Kinetic Dispersion Corporation) at 180° F. for 30 minutes. The mill base and premix were then blended with the petrobenzol and acetone in a high shear mixer until smooth and uniformly dispersed. The viscosity was reduced to 350 c.p.s. with a liquid carrier containing a 3:2 ratio of petrobenzol/acetone.

100 parts of the mixture, 50 parts of methylene chloride, and 50 parts of dichloro-difluoro methane (sold commercially as Freon 12) were charged into an epoxy-lined aerosol container in accordance with the procedure set forth in Example I. The contents of the aerosol container contained approximately 12.5% solids and approximately 7.7% dispersed insoluble polychloroprene elastomer. The internal pressure of the container was approximately 31 p.s.i.g. at 70° F. The adhesive sprayed from the container with a smooth, uniform pattern, without stringing, squirting, or "cob-webbing." As in Example I, the adhesive could be sprayed onto porous surfaces without excessive "soak-in" and the adhesive properties of the product were not measurably impaired by aerosol packaging.

EXAMPLE IV

| | Parts by weight |
|---|---|
| Rubber | 350 |
| Dymerex resin (see Example I) | 245 |
| Stabalite ester #10 (see Example I) | 245 |
| Morpholine | 3.5 |
| Antioxidant (Agerite Stalite—see Example I) | 7.0 |
| Hexane | about 1300 |

The rubber was milled on a 16-inch laboratory mill set to operate with a gap between the rolls of 0.05 inch and a friction ratio of 1.33 to 1. The milling was continued for two minutes in each instance, during which time the temperature of the elastomer was limited to a maximum of about 120° F. by cooling the rolls with cold water. The milled elastomer was blended with the remainder of the ingredients in a high shear mixer until smooth and uniform. The viscosity was reduced to about 2,000 cps. by dilution with hexane. The amout of hexane used in each instance was varied to provide the solids content reported in each instance in Table No. 1.

A series of butadiene-styrene rubbers varying in gel content was used to provide a series of samples having 93, 85, 83 and 74% gel content. Adhesive formulations were prepared from each of these rubbers in accordance with the above formulation, at a series of solids contents achieved by varying the amount of hexane in the mixture.

60 parts of the adhesive mixture and 10 parts of propane propellant were packaged in glass bottle aerosol containers and pressurized as in Example I. The results obtained in attempting to spray these samples are tabulated in Table No. 1. The data is also shown graphically in FIGURE 1 of the drawings. Gel contents were determined by measuring solubility of the SBR rubber in toluene.

adhesive formulation as set forth in Example I. These include the amount of cross-linking of the rubber, the mill setting or distance between the rolls, the amount of cross-blending, and the mill temperature. The proportions of ingredients used in Example I above provide a particularly suitable range of small to large size colloidal particles. If stringing occurs due to the presence of too much soluble material, the proportion of cross-linked insoluble particles can be increased by increasing the proportion of the elastomer more highly cross-linked with divinyl benzene. If misting becomes a problem, the proportion of this elastomer should be reduced. Stringing and "cob-webbing" can also be reduced by reducing the mill time or the amount of cross-blending of the base elastomer during milling, or alternatively, the milling temperature can be increased to a limit of 300° F. and preferably below 250° F. In general any change in processing which increases the proportion of soluble elastomer will increase the tendency toward stringing or "cob-webbing" of the spray and decrease the tendency toward misting while any change in processing in which tends to increase the particle size or the proportion of insoluble elastomer will increase the tendency toward misting and decrease the tendency toward stringing or "cob-webbing." It will be understood that complete elimination of the formation of a nonadherent mist is not generally possible; however, excellent results can be achieved when no more than a small minor proportion of the spray is formed into a nonadherent mist.

By good sprayability is meant in addition to the absence of "cob-webbing" or excessive misting that the adhesive when sprayed on a substrate 8" to 10" from the nozzle will be deposited in a pattern at least one inch wide. The deposited adhesive will be in the form of a uniform continuous coating. The sprayed adhesive coating will not, probably due to the high solid content thereof, soak into porous substrates.

We claim:
1. A high solid content elastomeric based spray adhesive packaged under pressure, comprising a volatile organic carrier liquid; said liquid containing therein at least about 10% by weight solids including a tackifier resin dissolved in said carrier liquid and a milled elastomeric addition polymer from which impurities such as surfactants have been washed in the form of insoluble

TABLE 1

| Gel content of rubber, percent | Solids content, percent of adhesive | Solids content (percent of container contents) | Soluble rubber (percent of total container contents) | Pressure in container, p.s.i. | Observation |
|---|---|---|---|---|---|
| 93 | 12.0 | 10.3 | 0.42 | 25 | Mist, soaked paper. |
| 93 | 15.0 | 12.9 | 0.53 | 25 | Do. |
| 93 | 18.0 | 15.4 | 0.64 | 28 | Do. |
| 93 | 21.0 | 18.0 | 0.74 | 29 | Do. |
| 93 | 24.0 | 20.6 | 0.84 | 30 | Do. |
| 93 | 27.0 | 23.1 | 0.95 | 30 | Do. |
| 93 | 30.0 | 25.7 | 1.06 | 33 | Do. |
| 93 | 33.0 | 28.3 | 1.17 | 38 | Fair, some mist. |
| 93 | 36.0 | 30.9 | 1.27 | 39 | Good. |
| 93 | 38.5 | 33.0 | 1.36 | 39 | Fair, bubbles in coating. |
| 83 | 12.0 | 10.3 | .47 | 27 | Misty, soaks paper. |
| 83 | 15.0 | 12.9 | .58 | 27 | Do. |
| 83 | 18.0 | 15.4 | .70 | 32 | Do. |
| 83 | 21.0 | 18.0 | .82 | 33 | Do. |
| 83 | 24.0 | 20.6 | .93 | 36 | Good. |
| 83 | 27.0 | 23.1 | 1.05 | 36 | Do. |
| 83 | 30.0 | 25.7 | 1.16 | 36 | Do. |
| 83 | 33.0 | 28.3 | 1.28 | 38 | Fair. |
| 83 | 37.8 | 32.4 | 1.47 | 39 | Squirts. |
| 74 | 12.0 | 10.3 | .85 | 26 | Misty, soaks paper. |
| 74 | 15.0 | 12.9 | 1.06 | 27 | Do. |
| 74 | 18.0 | 15.4 | 1.27 | 28 | Do. |
| 74 | 21.0 | 18.0 | 1.48 | 34 | Good. |
| 74 | 24.0 | 20.6 | 1.70 | 36 | Do. |
| 74 | 27.0 | 23.1 | 1.90 | 36 | Fair. |
| 74 | 30.0 | 25.7 | 2.12 | 36 | Squirts. |
| 74 | 33.0 | 28.3 | 2.33 | 38 | Do. |
| 74 | 41.6 | 35.7 | 2.94 | 38 | Do. |

In the case of dried and milled elastomers of the type set forth in Examples I–III, several variables can be controlled in addition to the length of mill time and the age of the milled elastomer at the time it is mixed into the elastomeric particles less than about 150 microns in size dispersably suspended in said carrier liquid; said elastomeric polymer forming 5% to 25% by weight of said adhesive and having a gel content of about 60% to 97%, said adhesive containing from about 0.3 to 3% soluble elastomer, said elastomeric particles and said carrier liquid being contained in an aerosol container under pressure with a propellant which will cause said dispersion to spray when discharged from said container through an orifice without forming more than minor proportions of nonadherent mist and without forming rubbery strings.

2. An aerosol packaged adhesive which will spray without forming more than minor proportions of nonadherent mist and without forming rubbery strings comprising a sealed, pressurized container coated on its inside surfaces with a composition inert to the contents of the container, said container having an orifice for dispensing the contents, said orifice normally being closed; a means for opening said orifice to discharge the contents; a sprayable adhesive composition contained within said container comprising a volatile organic carrier liquid containing a tackifier resin dissolved therein, and a milled highly cross-linked rubbery addition polymer from which impurities such as surfactants have been washed, said polymer being insoluble in said carrier liquid in the form of insoluble particles dispersed in said carrier liquid; said rubbery polymer having a gel content of about 60% to 97%, said adhesive composition containing about 0.3 to 3% dissolved elastomers; a volatile organic propellant under a pressure of about 25 to 35 pounds per square inch contained in said container and being capable of volatilizing to break up said carrier liquid and the particles dissolved and dispersed therein into a spray upon opening of said orifice, said elastomeric material forming 5% to 25% of the contents of said container.

3. The article of claim 2 wherein said rubbery polymer comprises a butadiene-styrene polymer formed from approximately 72 parts butadiene and 27 parts styrene cross-linked by approximately 0.7 part divinyl benzene.

4. The article of claim 3 wherein the solid material comprises between 10% and 35% by weight of the contents of said container.

References Cited

UNITED STATES PATENTS

| | | | |
|---|---|---|---|
| 2,766,157 | 10/1956 | Peterson | 260—33.8 |
| 2,884,400 | 4/1959 | Moore | 260—33.6 |
| 3,332,903 | 7/1967 | Kavalir | 260—32.8 |

FOREIGN PATENTS

| | | |
|---|---|---|
| 586,489 | 11/1959 | Canada. |

MORRIS LIEBMAN, *Primary Examiner.*

L. T. JACOBS, *Assistant Examiner.*

PO-1050
(5/69)

UNITED STATES PATENT OFFICE
CERTIFICATE OF CORRECTION

Patent No. 3,400,095      Dated September 3, 1968

Inventor(s) Leon V. Kremer and George M. Rambosek

It is certified that error appears in the above-identified patent and that said Letters Patent are hereby corrected as shown below:

In Column 1, line 21, "nonadherent" should read -- non-adherent -- ;
  column 1, line 52, "semisolid" should read -- semi-solid.
Column 2, line 18, "redisperse" should read -- re-disperse -- ;
  column 2, line 47, "nonadherent" should read -- non-adherent -- .
Column 4, line 40, "nonlimitative" should read -- non-limitative -- .
Column 7, in "Table 1", second column heading ("Solids ... adhesive"), the word -- formulation -- should be inserted underneath the word "adhesive".
Column 8, lines 26 and 29, each occurrence of "nonadherent" should read -- non-adherent -- ;
Column 9, line 7, "nonadherent" should read -- non-adherent -- ; and
  column 9, lines 22 and 25, each occurrence of the semicolon (";") should be changed to a comma ( -- , -- ).

SIGNED AND
SEALED
JUL 21 1970

(SEAL)
Attest:

Edward M. Fletcher, Jr.
Attesting Officer

WILLIAM E. SCHUYLER, JR.
Commissioner of Patents